United States Patent [19]
Miyakawa et al.

[11] Patent Number: 5,926,300
[45] Date of Patent: Jul. 20, 1999

[54] OPTICAL ADD-DROP MULTIPLEXER

[75] Inventors: Takayuki Miyakawa; Hidenori Taga; Shu Yamamoto, all of Saitama; Shigeyuki Akiba, Tokyo, all of Japan

[73] Assignee: Kokusai Denshin Denwa Kabushiki Kaisha, Tokyo, Japan

[21] Appl. No.: 08/797,393

[22] Filed: Feb. 10, 1997

[30] Foreign Application Priority Data

Mar. 4, 1996 [JP] Japan ................................. 8-070951

[51] Int. Cl.$^6$ ..................................................... H04J 14/02
[52] U.S. Cl. ............................. 359/124; 359/130; 385/37
[58] Field of Search .................................. 357/130, 127, 357/125, 129, 124; 385/24, 37

[56] References Cited

U.S. PATENT DOCUMENTS

| | | | |
|---|---|---|---|
| 5,283,686 | 2/1994 | Huber | 359/337 |
| 5,467,212 | 11/1995 | Huber | 359/168 |
| 5,600,473 | 2/1997 | Huber | 359/130 |
| 5,633,741 | 5/1997 | Giles | 359/124 |
| 5,726,785 | 3/1998 | Chawki et al. | 359/130 |
| 5,748,349 | 5/1998 | Mizrahi | 359/130 |

FOREIGN PATENT DOCUMENTS

| | | |
|---|---|---|
| 0 730 172 A1 | 2/1996 | European Pat. Off. |
| 2 315 380 | 1/1998 | United Kingdom . |
| WO 97/06614 | 2/1997 | WIPO . |

OTHER PUBLICATIONS

"Evaluation of an Optical Boosted Add/Drop Multiplexer OBADM including circulators and fiber grating filters", by M.J. Chawki, L. Berthou, E. Delevaqye, E. Gay and I. LeGac for *Proc. 21st Eur. Conf. on Opt. Comm.,* Sep. 17, 1995.

*Primary Examiner*—Rafael Bacares
*Attorney, Agent, or Firm*—Westman, Champlin & Kelly, P.A.

[57] ABSTRACT

The present invention is directed towards an optical ADM apparatus provided with a narrow band-pass filter which is capable of minimizing declination of the transmission characteristics. An optical transmission prohibiting element composed of an optical isolator and a fiber grating is connected in series to the downstream of a fiber grating interposed between two optical circulators. The drop light is reflected by the fiber grating and released from an output optical fiber of the optical circulator. A leak component of the drop light having passed through the fiber grating appears on the side of the isolator and runs across the isolator to the other fiber grating. Most of the leak component is however reflected by the fiber grating while its small portion enters the optical circulator via the fiber grating. The small portion of the leak component is as small as negligible and will hardly interfere with the add light. The optical transmission prohibiting element may be an optical circulator.

10 Claims, 3 Drawing Sheets

OPTICAL ADD-DROP MULTIPLEXER

BACKGROUND OF THE INVENTION

1. Field of the Invention

The present invention relates to an optical add-drop multiplexer (ADM) and particularly, to an optical ADM apparatus provided with a narrow band-pass optical filter such as a fiber grating.

2. Description of the Related Art

A conventional example of such optical ADM apparatus is shown in FIG. 4 where while a particular wavelength component is extracted from a wavelength division multiplexed (WDM) light signal, an equivalent of the wavelength component extracted is added. As shown, the conventional ADM apparatus comprises a first optical circulator 31, a second optical circulator 32, and a fiber grating 33 connected between the first 31 and the second optical circulator 32. The wavelength division multiplexed (WDM) light signal is introduced to an input optical fiber 31a of the first optical circulator 31 and directed by the operation of the first optical circulator 31 to pass via a signal fiber 31b to the fiber grating 33 where a predetermined wavelength component of the light signal is reflected back. The predetermined wavelength component is returned to the first optical circulator 31 and outputted from its output optical fiber 31c as a drop light. Meanwhile, an add light of which wavelength is identical to that of the drop light is introduced to an input optical fiber 32a of the second optical circulator 32. The add light is directed by the operation of the second optical circulator 32 to pass via a signal fiber 32b to the fiber grating 33 where it is reflected back to the second optical circulator 32. Accordingly, the add light is combined with the light signal less the drop light and delivered from an output optical fiber 32c of the second optical circulator 32.

The conventional ADM apparatus has a drawback that both the drop light directed by the first optical circulator 31 to the fiber grating 33 and the add light directed by the second optical circulator 32 to the fiber grating 33 may incompletely be reflected back hence developing leak components which can pass across the fiber grating 33. For example, the leak component may be as a high level as 30 dB (0.1%) as illustrated in FIG. 5. The drop light and the add light are identical in the wavelength and their leak components may interfere with each other generating a beat noise and declining the transmission characteristics. More specifically, the leak component of 30 dB (S/X=30) leads to a transmission penalty of about 0.8 dB as shown in FIG. 6 which illustrates the dependence of the transmission penalty on the beat noise.

SUMMARY OF THE INVENTION

It is hence an object of the present invention, for eliminating the foregoing drawback of the prior art, to provide an optical ADM apparatus provided with a narrow band-pass optical filter for minimizing the declination of the transmission characteristics.

For achievement of the above object, an optical ADM apparatus according to the present invention has a plurality of optical functional elements, each having at least three ports for transmitting light introduced from the port A to the port B and light introduced from the port B to the port C, and a narrow band-pass filter interposed between the optical function elements, in which a drop light is extracted by one of the optical functional elements and an add light is added by other one of the optical functional elements, and is characterized by an optical transmission prohibiting element connected in series to the downstream of the narrow band-pass optical filter for prohibiting transmission of a light signal of which wavelength is identical to the wavelength to be rejected by the narrow band-pass optical filter.

Accordingly, the present invention allows a leak component of the drop light not to interfere with the add light and a leak component of the add light not to interfere with the drop light, causing no beat noise. As the result, the optical ADM apparatus of the present invention is capable of minimizing the declination of the transmission characteristics.

DETAILED DESCRIPTION OF THE PREFERRED EMBODIMENTS

Figure 1:
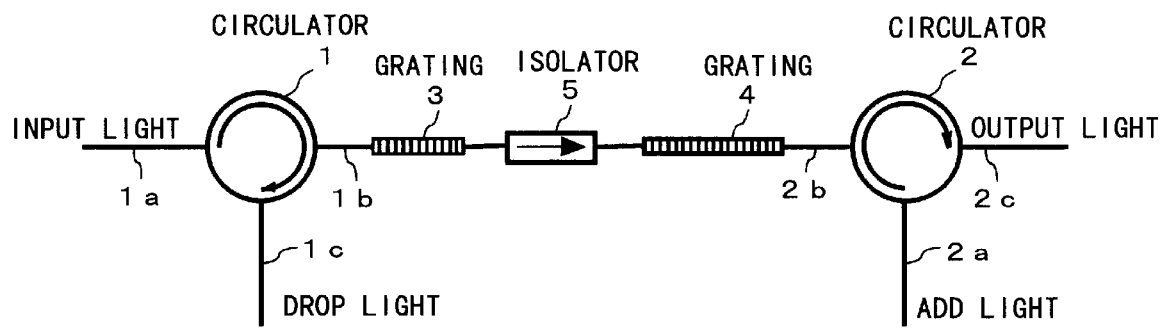
FIG. 1 is a block diagram showing an embodiment of the present invention.

The present invention will be described in more detail referring to the accompanying drawings. FIG. 1 is a circuitry diagram showing a first embodiment of the present invention. An optical ADM apparatus of the first embodiment comprises a first optical circulator 1, a second optical circulator 2, a first 3 and a second λ 1 reflective fiber grating 4, and an isolator 5 connected between the first 3 and the second λ 1 reflective fiber grating 4. The isolator 5 is provided for preventing a light signal from being reflected back and amplified between the first 3 and the second λ 1 reflective fiber grating 4.

The operation of the first embodiment will now be explained. A wavelength multiplexed light signal comprising a wavelength λ 1 and a wavelength λ 2 multiplexed is introduced to an input optical fiber 1a of the first optical circulator 1 and directed by the operation of the first optical circulator 1 to pass via a signal fiber 1b to the first λ 1 reflective fiber grating 3. The wavelength λ 1 of the light signal is reflected by the first λ 1 reflective fiber grating 3 and released as a drop light from an output fiber 1c of the first optical circulator 1.

Meanwhile, an add light having the wavelength λ 1 is introduced to an input fiber 2a of the second optical circulator 2 and directed by the operation of the second optical circulator 2 to the second λ 1 reflective fiber grating 4. The add light is then reflected back by the second λ 1 reflective fiber grating 4 and combined with the light signal of the wavelength λ 2 which has passed through the first λ 1 reflective fiber grating 3, the isolator 5, and the second λ 1 reflective fiber grating 4, before released from an output fiber 2c of the second optical circulator 2.

Figure 6:
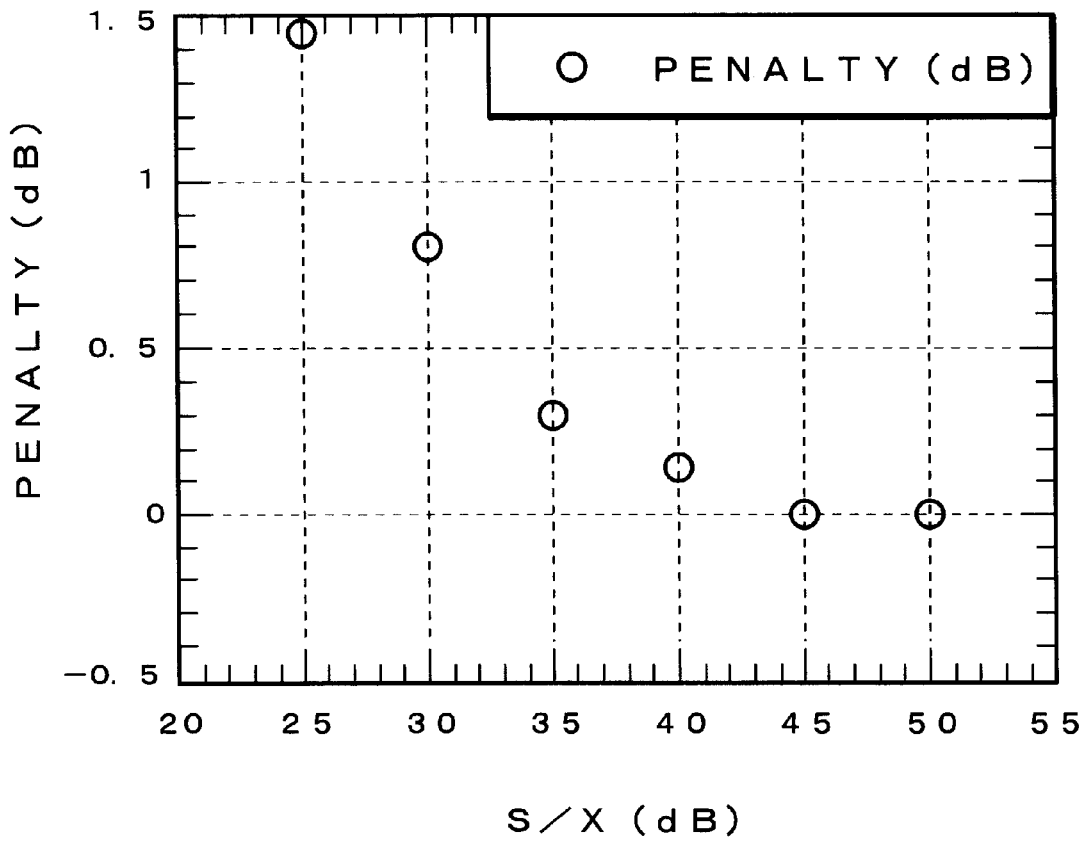
FIG. 6 is a graph showing the transmission penalty caused by a leak component of a drop light.
Figure 5:
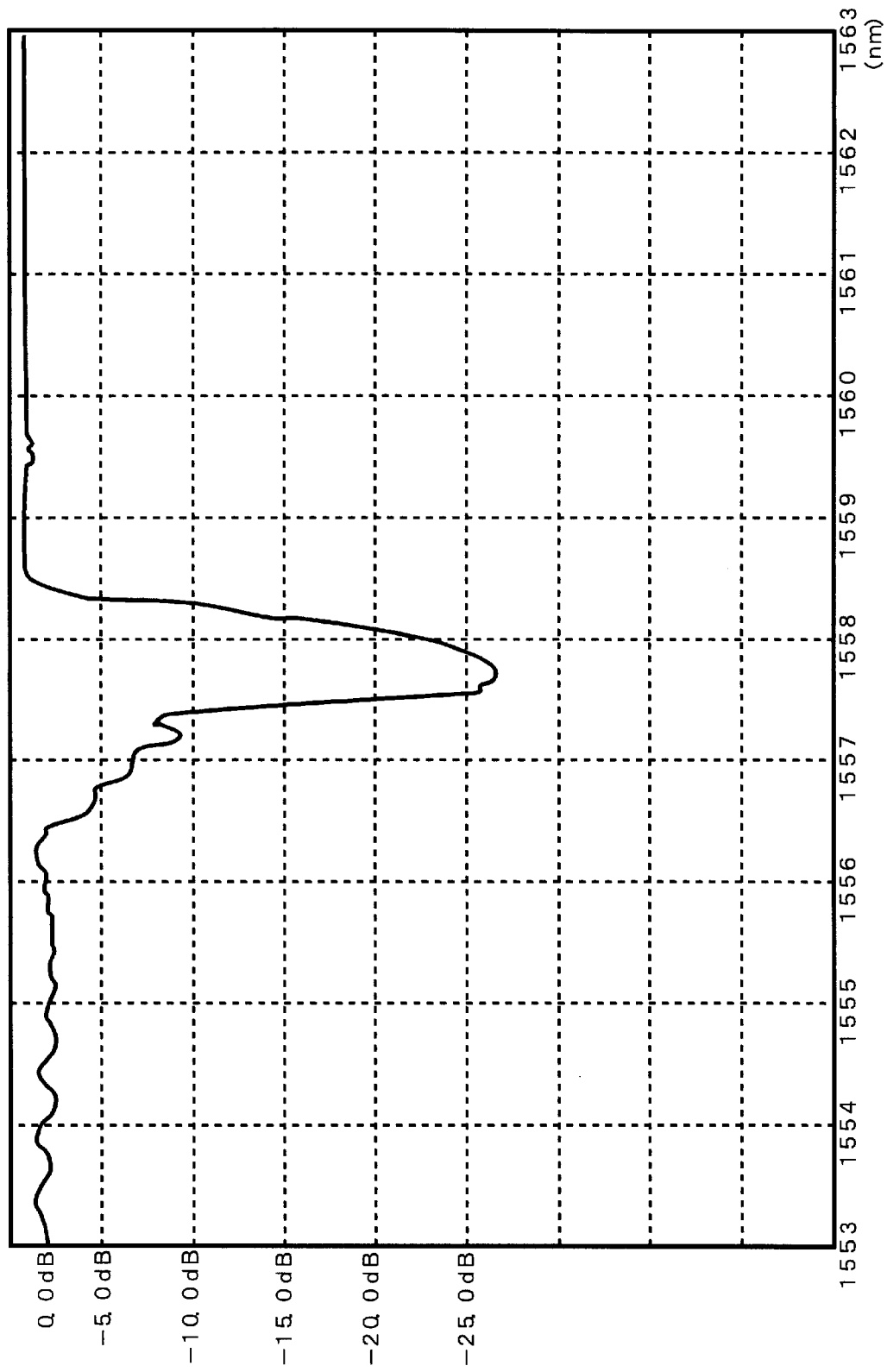
FIG. 5 is a graph showing a characteristic of a fiber grating.

If a leak component of the drop light is developed in the first λ 1 reflective fiber grating 3, it runs across the isolator 5 and enters the second λ 1 reflective fiber grating 4. The leak component is then reflected by the second λ 1 reflective fiber grating 4 and returned to the isolator 5. As the isolator 5 is designed to interrupt the transmission of light in the opposite direction, the leak component of the drop light reflected by the second λ 1 reflective fiber grating 4 is not allowed to pass the isolator 5. When the leak component of the drop light has passed through the second λ 1 reflective fiber grating 4, it is attenuated to a substantial level which is 2 times in the order of dB higher than of the conventional apparatus and will hardly interfere with the add light introduced in the second optical circulator 2 thus preventing the generation of beat noise or the declination of the transmission characteristics. This effect is also apparent from FIG. 6, where the transmission penalty is almost zero with the leak component S/X of higher than 45 dB. In the embodiment, the leak component S/X is as high as 60 dB and the transmission penalty will be very close to 0.

The leak component may be increased to three times the dB level with the use of another combination of the isolator and the fiber grating interposed between the second λ 1 reflective fiber grating 4 and the second optical circulator 2. The isolator 5 also prevents transmission of the add light from the second optical circulator 2 to the first optical circulator 1, hence causing no deterioration of the drop light.

Figure 2:
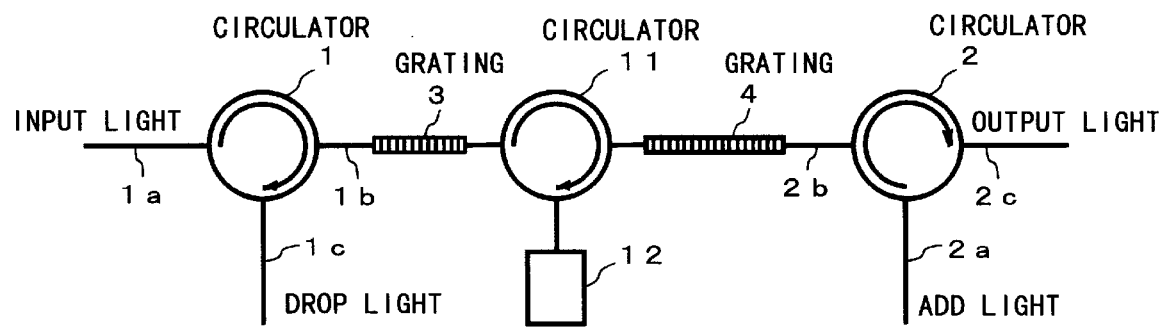
FIG. 2 is a block diagram showing a second embodiment of the present invention.

A second embodiment of the present invention will be described referring to the circuitry diagram of FIG. 2. The second embodiment is differentiated from the first embodiment by the fact that the isolator 5 shown in FIG. 1 is substituted by a third optical circulator 11 and a terminal 12. Like numerals as shown in FIG. 1 represent identical or similar components.

In the second embodiment, a leak component of the drop light from a first λ 1 reflective fiber grating 3 is directed via the third optical circulator 11 to a second λ 1 reflective fiber grating 4. Its most part is then reflected by the second λ 1 reflective fiber grating 4 and returned to the third optical circulator 11 where it is directed to the terminal 12 for absorption. Accordingly, most of the leak component reflected back by the second λ 1 reflective fiber grating 4 is eliminated. Meanwhile, a part of the leak component has passed through the second λ 1 reflective fiber grating 4 and its dB level is attenuated to ½. The same advantage as of the first embodiment will thus be expected. If a leak component of the add light having the wavelength λ 1 runs across the second λ 1 reflective fiber grating 4, it is directed by the third optical circulator 11 to the terminal 12 where it is absorbed.

A monitor may be provided in place of the terminal 12 for monitoring a sum of the two leak components of the drop and add lights. This allows monitoring of both the upstream and downstream of the optical ADM apparatus. More particularly, when the sum of the two leak components of the drop and add lights, i.e. the intensity of light measured by the monitor, is dropped to ½ of the normal dB level, it is judged that either of the upstream and downstream is nearly or completely disconnected.

Figure 3:
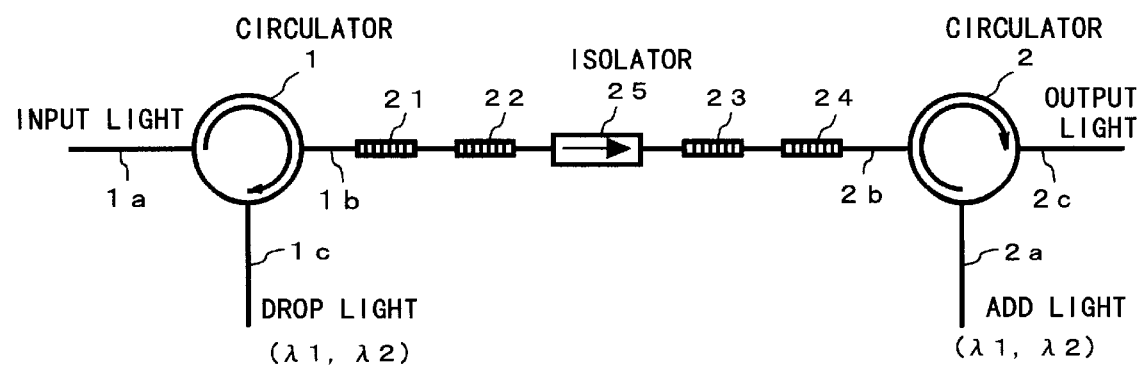
FIG. 3 is a block diagram showing a third embodiment of the present invention.
Figure 4:
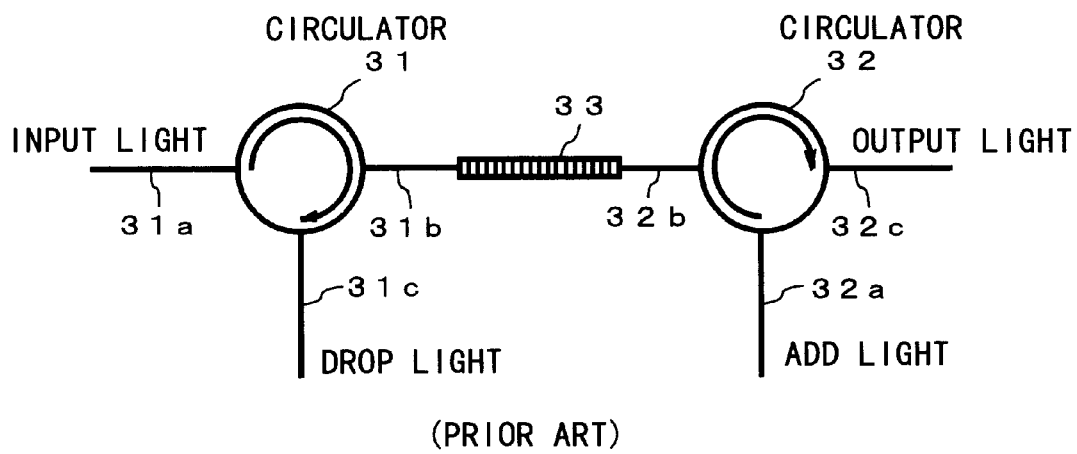
FIG. 4 is a block diagram showing a conventional optical ADM apparatus.

A third embodiment of the present invention will be described referring to FIG. 3. The third embodiment is realized by an optical ADM apparatus of multi-wavelength type in which provided between the first 1 and the second optical circulator 2 are a first λ 1 reflective fiber grating 21, a first λ 2 reflective fiber grating 22, an isolator 25, a second λ 1 reflective fiber grating 23, and a second λ 2 reflective fiber grating 24.

The operation of the third embodiment will be explained. A wavelength multiplexed light signal of interest is fed to an input optical fiber 1a of the first optical circulator 1 and directed by the operation of the first optical circulator 1 to a signal fiber 1b. The light signal is then passed to the first λ 1 reflective fiber grating 21 and the first λ 2 reflective fiber grating 22. The wavelengths λ 1 and λ 2 of a drop light of the light signal are reflected by the first λ 1 and λ 2 reflective fiber gratings 21 and 22 respectively and outputted from an output optical fiber 1c.

Meanwhile, an add light having the wavelengths λ 1 and λ 2 is introduced to an input optical fiber 2a of the second optical circulator 2, passed through the second optical circulator 2, and directed to and reflected by the second λ 1 reflective fiber grating 23 and the second λ 2 reflective fiber grating 24 respectively. The add light is then combined with the light signal which has passed through the first λ 1 reflective fiber grating 21, the first λ 2 reflective fiber grating 22, the isolator 25, the second λ 1 reflective fiber grating 23, and the second λ 2 reflective fiber grating 24 and been excluded the drop component, and transmitted from an output optical fiber 2c of the second optical circulator 2.

Leak components of the drop light derived from the first λ 1 reflective fiber grating 21 and the first λ 2 reflective fiber grating 22 respectively are passed through the isolator 25 and directed to and reflected by the second λ 1 reflective fiber grating 23 and the second λ 2 reflective fiber grating 24 respectively. The reflected leak components enter the isolator 25 from the opposite direction and thus are eliminated. A part of the leak components which has passed through the second λ 1 reflective fiber grating 23 and the second λ 2 reflective fiber grating 24 is attenuated to ½ in the level and will hardly interfere with the add light introduced to the second optical circulator 2. The isolator 25 in the embodiment may be substituted by a combination of an optical circulator 11 and a terminal 12 such as shown in FIG. 2.

The present invention is not limited to the above described embodiments of the multi-wavelength optical ADM apparatuses using at least the two optical circulators 1 and 2 but is applicable to any other optical devices including an optical ADM apparatus provided with a multiplexer/demultiplexer such as a 3 dB coupler. In common, the present invention is successfully applied to an optical ADM apparatus using at least a three-port optical functional element in which light introduced to the port A is outputted from the port B and light introduced to the port B is outputted from the port C.

The present invention has a narrow band-pass filter interposed between optical functional elements and an optical transmission prohibiting element connected in series to the downstream of the narrow band-pass filter for prohibiting transmission of a light signal component of which wavelength is identical to the wavelength to be rejected by the narrow band-pass optical filter, whereby a leak component of the drop light is attenuated by a combination of the narrow band-pass optical filter and the optical transmission prohibiting element to a substantial level which is two times greater in the order dB than of the prior art. Accordingly, the add light is prevented from interference with the leak component of the drop light.

A leak component of the add light is also attenuated by the optical transmission prohibiting element and the narrow band-pass filter to a level which is two times greater in dB than of the prior art and will be avoided from interference with the drop light. As the result, the present invention provides an improved optical ADM apparatus in which declination of the transmission characteristics is minimized.

An optical ADM apparatus for subjecting a light signal having two or more wavelengths to add and drop function according to the present invention is also enhanced in the transmission characteristics.

What is claimed is:

1. An optical add-drop multiplexer apparatus having optical functional elements, each having at least three ports for transmitting light introduced from the port A to the port B and light introduced from the port B to the port C, and a narrow bandwidth optical filter interposed between the optical function elements, in which a drop light is extracted by one of the optical functional elements and an add light is added by other one of the optical functional elements, comprising:

an optical transmission prohibiting element connected in series between the narrow bandwidth optical filter and one of the optical functional elements at the downstream of the narrow bandwidth optical filter for prohibiting transmission of a light signal of which wavelength is identical to the wavelength to be rejected by the narrow bandwidth optical filter.

2. The optical add-drop multiplexer apparatus according to claim 1, wherein the narrow bandwidth optical filter rejects at least one wavelength of the light signal and the optical transmission prohibiting element prohibits transmission of a light signal of the same wavelength.

3. The optical add-drop multiplexer apparatus according to claims 1, wherein one of the optical functional elements is an optical circulator or a multiplexer/demultiplexer.

4. The optical add-drop multiplexer apparatus according to claim 1, wherein the optical transmission prohibiting element is a combination of a narrow bandwidth optical filter and an optical isolator.

5. The optical add-drop multiplexer apparatus according to claim 3, wherein the optical transmission prohibiting element is a combination of a narrow bandwidth optical filter and an optical isolator.

6. The optical add-drop multiplexer apparatus according to claim 1, wherein the optical transmission prohibiting element is a combination of a narrow bandwidth optical filter and an optical isolator, and further comprising a terminal connected to the output of an optical circulator where reflected light from the narrow bandwidth optical filter is released.

7. The optical add-drop multiplexer apparatus according to claim 3, wherein the optical transmission prohibiting element is a combination of a narrow bandwidth optical filter and an optical isolator, and further comprising a terminal connected to the output of the one of the optical functional elements where reflected light from the narrow bandwidth optical filter is released.

8. The optical add-drop multiplexer apparatus according to claim 6, wherein the terminal is substituted by a monitor for monitoring the level of light.

9. An optical add-drop multiplexer apparatus comprising:

a first optical functional element having at least three ports for transmitting light introduced from the port A to the port B and light introduced from the port B to the port C;

a first narrow bandwidth filter having at one end a port A for receiving an output of light from the port B of the first optical functional element and at the other end a port B, and arranged for selectively rejecting a wavelength $\lambda$;

an optical isolator having at one end a port A for receiving an output of light from the port B of the first narrow bandwidth optical filter and at the other end a port B, and arranged for transmitting a light input from its port A while rejecting a light input from its port B;

a second narrow bandwidth filter having at one end a port A for receiving an output of light from the port B of the optical isolator and at the other end a port B, and arranged for selectively rejecting the wavelength $\lambda$; and a second optical functional element having at least three ports for receiving at the port A an output of light from the port B of the second narrow bandwidth optical filter, and transmitting it from the port A to the port B and an input of light introduced from the port B to the port C.

10. An optical add-drop multiplexer apparatus comprising:

a first optical functional element having at least three ports for transmitting light introduced from the port A to the port B and light introduced from the port B to the port C;

a first narrow bandwidth filter having at one end a port A for receiving an output of light from the port B of the first optical functional element and at the other end a port B, and arranged for selectively rejecting a wavelength $\lambda$;

a second optical functional element having at least three ports for receiving at the port A an output of light input from the port B of the first narrow bandwidth optical filter, and transmitting it from the port A to the port B and an input of light introduced from the port B to the port C;

a terminal means for receiving and absorbing, but not reflecting, an output of light from the port C of the second optical functional element;

a second narrow bandwidth filter having at one end a port A for receiving an output of light from the port B of the second optical functional element and at the other end a port B, and arranged for selectively rejecting the wavelength $\lambda$; and a third optical functional element having at least three ports for receiving at the port A an output of light from the port B of the second narrow bandwidth optical filter, and transmitting it from the port A to the port B and an input of light supplied from the port B to the port C.

* * * * *